US006963569B1

(12) United States Patent
Briddell et al.

(10) Patent No.: US 6,963,569 B1
(45) Date of Patent: Nov. 8, 2005

(54) DEVICE FOR INTERWORKING ASYNCHRONOUS TRANSFER MODE CELLS

(75) Inventors: Dennis M. Briddell, Cary, NC (US); Chirag Shroff, Cary, NC (US); Harshad B. Nakil, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 842 days.

(21) Appl. No.: 09/751,794

(22) Filed: Dec. 29, 2000

(51) Int. Cl.[7] .............................................. H04L 12/28
(52) U.S. Cl. ................................ 370/395.1; 370/395.5
(58) Field of Search ......................... 370/395.1, 395.2, 370/395.6, 395.61, 395.62, 395.63, 400–403, 370/466, 469–476, 458, 351–353, 389, 392, 370/395.5, 395.64, 395.65, 411, 466.7; 710/100, 710/101, 105, 129, 131

(56) References Cited

U.S. PATENT DOCUMENTS 5,619,500 A * 4/1997 Hiekali ....................... 370/414
5,764,151 A 6/1998 Wu ............................ 340/635
5,764,637 A 6/1998 Nishihara ................... 370/397
5,822,383 A 10/1998 Muntz et al. ............... 375/362
5,822,612 A 10/1998 Thomas et al. ............. 395/826
5,896,427 A 4/1999 Muntz et al. .............. 375/372
5,898,688 A 4/1999 Norton et al. ............. 370/362
5,920,566 A 7/1999 Hendel et al. ............. 370/401
5,930,525 A 7/1999 Gotesman et al. .......... 395/850
5,938,736 A 8/1999 Muller et al. ............... 709/243
5,940,395 A 8/1999 Fraenkel et al. ............ 370/401
5,946,310 A 8/1999 Ujiie .......................... 370/395
5,974,031 A 10/1999 Kwan et al. ................ 370/252
5,983,278 A 11/1999 Chong et al. ............... 709/235
6,009,092 A 12/1999 Basilico ...................... 370/352
6,014,380 A 1/2000 Hendel et al. .............. 370/392
6,016,310 A 1/2000 Muller et al. ............... 370/255
6,044,087 A 3/2000 Muller et al. ............... 370/463
6,044,418 A 3/2000 Muller ........................ 710/56
6,049,528 A 4/2000 Hendel et al. .............. 370/235
6,052,738 A 4/2000 Muller et al. ............... 709/250
6,061,362 A 5/2000 Muller et al. ............... 370/463
6,081,512 A 6/2000 Muller et al. ............... 370/256
6,081,522 A 6/2000 Hendel et al. .............. 370/389
6,088,356 A 7/2000 Hendel et al. .............. 370/392
6,091,729 A 7/2000 Dove .......................... 370/395
6,094,435 A 7/2000 Hoffman et al. ............ 370/414
6,108,335 A 8/2000 Ganmukhi et al. ......... 370/395
6,108,382 A 8/2000 Gringeri et al. ............ 375/240
6,119,196 A 9/2000 Muller et al. ............... 710/243

(Continued)

OTHER PUBLICATIONS

Stallings Data and Computer Communications, 1997, Prentice-Hall, INc., 5th edition, PP: 176-179, 184-186.*

(Continued)

*Primary Examiner*—David Vincent
(74) *Attorney, Agent, or Firm*—Baker Botts L.L.P.

(57) ABSTRACT

A telecommunication environment includes an interface card and a system communication controller. The interface card provides an asynchronous transfer mode interworking capability that is compatible with a serial communications controller within the system communication controller. A transmission convergence sublayer within the interface card identifies valid asynchronous transfer mode cells carried over a T1/E1 trunk link. The valid asynchronous transfer mode cells are transferred to an encapsulation unit within the interface card. The encapsulation unit generates encapsulated frames in a protocol format understood by the serial communications controller. The encapsulated frames carry asynchronous transfer mode cells for processing by the system communication controller. A processor within the system communication controller performs segmentation and reassembly processes on payload extracted by the serial communications controller.

20 Claims, 1 Drawing Sheet

U.S. PATENT DOCUMENTS 6,128,666 A 10/2000 Muller et al. ............... 709/238
6,519,261 B1 * 2/2003 Brueckheimer et al. ............................................................................ 370/395.52
2002/0167949 A1 * 11/2002 Bremer et al. ........... 370/395.1

OTHER PUBLICATIONS

Stallings, ISDN and Broadband ISDN with Frame Relay and ATM, 1999, Prentice-Hall, Inc., 4th edition, PP: 427-434, 438-446, 450.*

Stallings Data and Computer Communications, 1997, Prentice-Hall, Inc., 5th edition, PP: 176-179, 184-186.*

Newton, Newton's Telecom Dictionary, 1996, Flatiron Publishing, Inc., $10^{th}$ edition, p. 436.*

Cisco, Dictionary of Internetworking Terms and Acronyms, Jan. 2001, p. 129.*

* cited by examiner

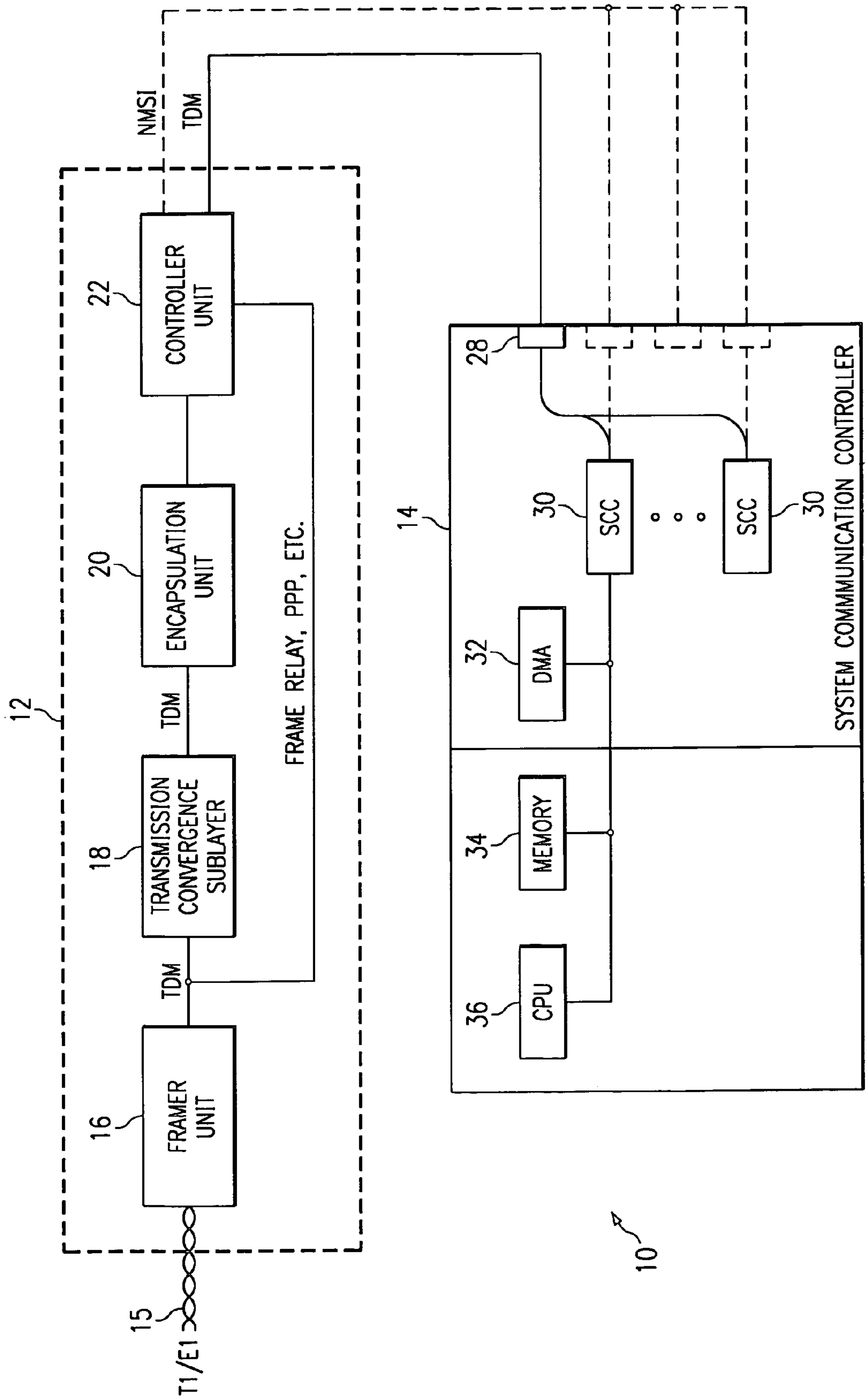
T1/E1
15
16
FRAMER UNIT
TDM
18
TRANSMISSION CONVERGENCE SUBLAYER
TDM
20
ENCAPSULATION UNIT
22
CONTROLLER UNIT
FRAME RELAY, PPP, ETC.
12
NMSI
TDM
14
28
30
SCC
SCC
30
32
DMA
34
MEMORY
36
CPU
SYSTEM COMMUNICATION CONTROLLER
10

DEVICE FOR INTERWORKING ASYNCHRONOUS TRANSFER MODE CELLS

TECHNICAL FIELD OF THE INVENTION

The present invention relates in general to telecommunications signal processing and more particularly to a device for interworking asynchronous transfer mode cells.

BACKGROUND OF THE INVENTION

Conventional asynchronous transfer mode interworking techniques utilize an interface device that identifies traffic for asynchronous transfer mode processing and transfers the traffic to a separate device for processing. Non-asynchronous transfer mode traffic follows a separate and different processing path. Thus, a schism exists in the industry with respect to products that perform asynchronous transfer mode interworking and products that perform conventional wide area network processing. Therefore, it is desirable to eliminate this schism when providing an asynchronous transfer mode interworking capability.

SUMMARY OF THE INVENTION

From the foregoing, it may be appreciated by those skilled in the art that a need has arisen for a technique to integrate asynchronous transfer mode interworking in a wide area network transport environment. In accordance with the present invention, a device for interworking asynchronous transfer mode cells is provided that substantially eliminates or greatly reduces disadvantages and problems associated with conventional asynchronous transfer mode processing techniques.

According to an embodiment of the present invention, there is provided a device for interworking asynchronous transfer mode cells that includes a transmission convergence sublayer that receives traffic carrying asynchronous transfer mode cells. Transmission convergence sublayer identifies each traffic carrying asynchronous transfer mode cell received. An encapsulation unit receives traffic carrying asynchronous transfer mode cells identified by the transmission convergence sublayer. The encapsulation unit encapsulates each identified traffic carrying asynchronous transfer mode cell into an encapsulation frame having a protocol format readable by a serial communications controller.

The present invention provides various technical advantages over conventional asynchronous transfer mode processing techniques. For example, one technical advantage is to encapsulate asynchronous transfer mode cells in a protocol format readable by a serial communications controller. Another technical advantage is to use conventional serial communications controllers designed for frame relay or other packet protocols in processing asynchronous transfer mode cell information. Yet another technical advantage is to provide a device that can be programmed to provide any information transfer service at any port. Other technical advantages may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 1 illustrates a simplified block diagram of an asynchronous transfer mode interworking device in a telecommunications environment.

DETAILED DESCRIPTION OF THE INVENTION

FIG. 1 is a block diagram of a telecommunication environment 10. Telecommunication environment 10 includes an interface card 12 and a system communication controller 14. Interface card 12 receives traffic carried on a T1/E1 trunk line 15, processes the traffic stream, and provides the traffic stream to system communication controller 14 for analysis and further processing. Interface card 12 includes a framer unit 16, a transmission convergence sublayer 18, an encapsulation unit 20, and a controller unit 22. System communication controller 14 includes one or more serial communications controllers 30, a direct memory access unit 32, a main memory 34, and a processor 36.

Interface card 12 provides an any port, any service capability through a traditional wide area network link. Interface card 12 may provide through the same hardware an asynchronous transfer mode interworking capability as well as the ability to process traffic in other protocols including frame relay, point to point (PPP), and high level data link control (HDLC) protocols. Information may be downloaded to any element of interface card 12 to allow for changing of communication capabilities of interface card 12 according to a desired operating protocol.

For asynchronous transfer mode interworking operation, framer unit 16 receives traffic carrying asynchronous transfer mode cells from T1/E1 trunk line 15. Framer unit 16 provides the asynchronous transfer mode cells to transmission convergence sublayer 18 for processing preferably over a time division multiplexed bus. Transmission convergence sublayer 18 identifies and demarcates each asynchronous transfer mode cell. Transmission convergence sublayer 18 recognizes a beginning and end of an asynchronous transfer mode cell and checks its payload for traffic or null information. If an asynchronous transfer mode cell has null information in its payload, then transmission convergence sublayer discards the null cell. If the payload of an asynchronous transfer mode cell carries traffic, then transmission convergence sublayer 18 performs header error correction and checksum processing on the asynchronous transfer mode cell. Asynchronous transfer mode cells that fail header error correction and/or checksum processing are discarded by transmission convergence sublayer 18. All valid traffic carrying asynchronous transfer mode cells are provided to encapsulation unit 20. Transmission convergence sublayer 18 preferably removes the header error correction byte of valid asynchronous transfer mode cells prior to transfer to encapsulation unit 20.

Encapsulation unit 20 facilitates communications between transmission convergence sublayer 18 and serial communications controller 30. Typically, serial communications controller 30 does not understand the asynchronous transfer mode format nor does it know what an asynchronous transfer mode cell is, but serial communications controller 30 does understand certain protocols. Encapsulation unit 20 will place the valid asynchronous transfer mode cells into a protocol format understandable by serial communications controller 30 so that the asynchronous transfer mode format is transparent to serial communications controller 30. Preferably, encapsulation unit 20 generates encapsulated frames carrying the asynchronous transfer mode cells using the HDLC protocol though other protocols readable by serial communications controller 30 may also be implemented as desired. Encapsulated frames are provided to controller unit 22.

For operation flexibility, interface card 14 may operate in a conventional mode where traffic is received and processed at framer unit 16 in a protocol, such as frame relay, recognizable by serial communications controller 30. Controller unit 22 determines whether asynchronous transfer mode interworking or conventional protocol processing is being performed by interface card 14. If conventional protocol processing is being performed, controller unit 22 provides the traffic directly from framer unit 16 to serial communications controller 30. For asynchronous transfer mode interworking operation, controller unit 22 provides encapsulated frames to serial communications controller from encapsulation unit 20. Traffic may be provided from controller unit 22 over a time division multiplexed bus to one or more ports 28 for receipt by a plurality of serial communications controllers 30. Alternatively, controller unit 22 may provide traffic to serial communications controllers 30 over a National Mobile Station Identification (NMSI) link where each serial communications controller 30 can receive traffic from its dedicated port 28.

Upon receiving the encapsulated frame, serial communications controller 30 extracts the traffic payload and sends the traffic payload to main memory 34 as controlled by direct memory access unit 32. Processor 36 takes the traffic payload and performs a segmentation and reassemble process to recover the traffic. The segmentation and reassemble process is performed in software by processor 36. Though an asynchronous transfer mode cell is transparent to serial communications controller 30, processor 36 can recognize the asynchronous transfer mode cell in order to perform the appropriate segmentation and reassemble process.

In the upstream direction for asynchronous transfer mode interworking, encapsulation unit 20 receives encapsulated frames from serial communications controller 30. Encapsulation unit 20 performs un-encapsulation of the asynchronous transfer mode cells from the encapsulated frames. Encapsulation unit 20 performs bit stuffing as necessary. The un-encapsulated asynchronous transfer mode cells are provided to transmission convergence sublayer 18 for processing. Transmission convergence sublayer 18 re-inserts a header error correction byte into each asynchronous transfer mode cell received from encapsulation unit 20. Transmission convergence sublayer 18 also inserts null cells as necessary for proper traffic transport.

Thus, it is apparent that there has been provided, in accordance with the present invention, a device for interworking asynchronous transfer mode cells that satisfies the advantages set forth above. Although the present invention has been described in detail, it should be understood that various changes, substitutions, and alterations may be readily ascertainable by those skilled in the art and may be made herein without departing from the spirit and scope of the present invention as defined by the following claims.

What is claimed is:

1. A device for interworking asynchronous transfer mode cells, comprising:

a transmission convergence sublayer operable to receive one or more traffic streams, the transmission convergence sublayer being operable to identify a selected one of the one or more traffic streams carrying asynchronous transfer mode cells; and an encapsulation unit operable to receive the selected traffic stream carrying the asynchronous transfer mode cells identified by the transmission convergence sublayer, the encapsulation unit being operable to encapsulate the traffic stream carrying the asynchronous transfer mode cells into an encapsulated frame having a protocol format readable by a serial communications controller that receives the encapsulated frame, wherein the transmission convergence sublayer is operable to have traffic in the selected one of the one or more traffic streams not carrying asynchronous transfer mode cells be provided to the serial communications controller without being encapsulated by the encapsulation unit.

2. The device of claim 1, further comprising:

a framer unit operable to receive the traffic streams from a trunk line, the framer unit being operable to provide the traffic streams to the transmission convergence sublayer.

3. The device of claim 2, further comprising:

a controller unit operable to receive one or more of the traffic streams from the framer unit, the controller unit being further operable to communicate data from the framer unit and the encapsulation unit for transfer to the serial communications controller.

4. The device of claim 3, wherein the controller unit is operable to select the data from the framer unit and the encapsulation unit to be propagated using respective links based on whether or not the data is carrying asynchronous transfer mode cells.

5. The device of claim 4, wherein the data includes one or more packets associated with a selected one of a frame relay protocol, a point to point protocol (PPP), and a high level data link control (HDLC) protocol.

6. The device of claim 1, wherein the transmission convergence sublayer is operable to identify and to discard asynchronous transfer mode null cells associated with a asynchronous transfer mode traffic that does not include a payload.

7. The device of claim 1, wherein the transmission convergence sublayer is operable to perform header error correction for the selected asynchronous transfer mode stream prior to communicating the selected stream to the encapsulation unit.

8. The device of claim 1, wherein the transmission convergence sublayer is operable to perform header error correction and checksum functions, and to discard one or more of the asynchronous transfer mode cells with header error correction or checksum failures.

9. The device of claim 1, wherein the encapsulated frame is transferred to the serial communication controller over a time division multiplexed communication link.

10. The device of claim 1, wherein the transmission convergence sublayer and the encapsulation unit are operable to receive programming commands to change a communication capability of the device.

11. A method for interworking asynchronous transfer mode cells, comprising:

receiving one or more traffic streams;

identifying a selected one of the traffic streams as including one or more asynchronous transfer mode cells carrying telecommunications traffic;

encapsulating one ore more of the asynchronous transfer mode cells into an encapsulated frame having a protocol format readable by a serial communications controller;

identifying telecommunications traffic in the selected one of the one or more traffic streams as not being carried by asynchronous transfer mode cells;

bypassing encapsulation for the telecommunications traffic not being carried by asynchronous transfer mode cells.

12. The method of claim 11, further comprising:

determining whether or not the received traffic includes one or more of the asynchronous transfer mode cells; and providing one or more of the traffic streams that do not include one or more of the asynchronous transfer mode cells directly to the serial communications controller.

13. The method of claim 11, wherein a selected one of the streams includes frame relay packets.

14. The method of claim 11, further comprising:

discarding one or more of the asynchronous transfer mode cells that do not carry a payload.

15. The method of claim 11, further comprising:

performing a header error correction function for one or more of the asynchronous transfer mode cells received.

16. The method of claim 11, further comprising:

performing header error correction and checksum functions for one or more of the asynchronous transfer mode cells.

17. The method of claim 16, further comprising:

discarding one or more of the asynchronous transfer mode cells that fail the header error correction or checksum functions.

18. The method of claim 11, further comprising:

receiving programming commands in order to change a communication capability according to a desired protocol format for the communications controller.

19. The method of claim 18, wherein the desired protocol format is a high level data link control protocol.

20. A device for interworking asynchronous transfer mode cells, comprising:

means for receiving one or more traffic streams;

means for identifying a selected one of the traffic streams as including one or more asynchronous transfer mode cells carrying telecommunications traffic; and means for encapsulating one ore more of the asynchronous transfer mode cells into an encapsulated frame having a protocol format readable by a serial communications controller;

means for identifying telecommunications traffic in the selected one of the one or more traffic streams as not being carried by asynchronous transfer mode cells;

means for bypassing encapsulation for the telecommunications traffic not being carried by asynchronous transfer mode cells.

* * * * *

UNITED STATES PATENT AND TRADEMARK OFFICE

CERTIFICATE OF CORRECTION

PATENT NO. : 6,963,569 B1
APPLICATION NO. : 09/751794
DATED : November 8, 2005
INVENTOR(S) : Dennis M. Briddell et al.

It is certified that error appears in the above-identified patent and that said Letters Patent is hereby corrected as shown below:

Column 4, Line 61, Claim 11, after “encapsulating one” delete “ore” and insert -- or --.
Column 6, Line 14, Claim 20, after “encapsulating one” delete “ore” and insert -- or --.

Signed and Sealed this

Fifteenth Day of August, 2006

JON W. DUDAS
*Director of the United States Patent and Trademark Office*